United States Patent

[11] 3,598,447

[72] Inventor Arnold B. Bower, Jr.
St. Clair Shores, Mich.
[21] Appl. No. 837,684
[22] Filed June 30, 1969
[45] Patented Aug. 10, 1971
[73] Assignee General Electric Company

[54] CUTTER BITS AND BLOCKS FOR MINING MACHINES
5 Claims, 3 Drawing Figs.

[52] U.S. Cl. ................................................ 299/91, 299/83
[51] Int. Cl. .................................................. E21c 35/18
[50] Field of Search .......................................... 37/142; 175/413; 299/82—84, 91—93

[56] References Cited
UNITED STATES PATENTS
2,769,628 11/1956 Joy ............................... 299/93
3,057,091 10/1962 Peterson ........................ 175/413 X
3,190,379 6/1965 Troeppl et al. ................. 175/413 X
FOREIGN PATENTS
1,118,233 0/1956 France ........................... 299/82
426,941 0/1935 Great Britain .................. 299/93

Primary Examiner—Ernest R. Purser
Attorneys—Harold J. Holt, Frank L. Neuhauser, Oscar B. Waddell and Joseph B. Forman ABSTRACT: A cutter bit for a mining machine, the shank of which is in the shape of an inverted U, is adapted for mounting upon a block having a complementary-shaped recess in its midportion defining a bit-receiving zone to receive and releasably hold the cutter bit. The cutter bit may have a single head containing a single wider-than-normal hard cutting tip, or it may contain two or more heads, each containing cutting tips mounted transverse to the direction of cutting.

PATENTED AUG 10 1971 3,598,447
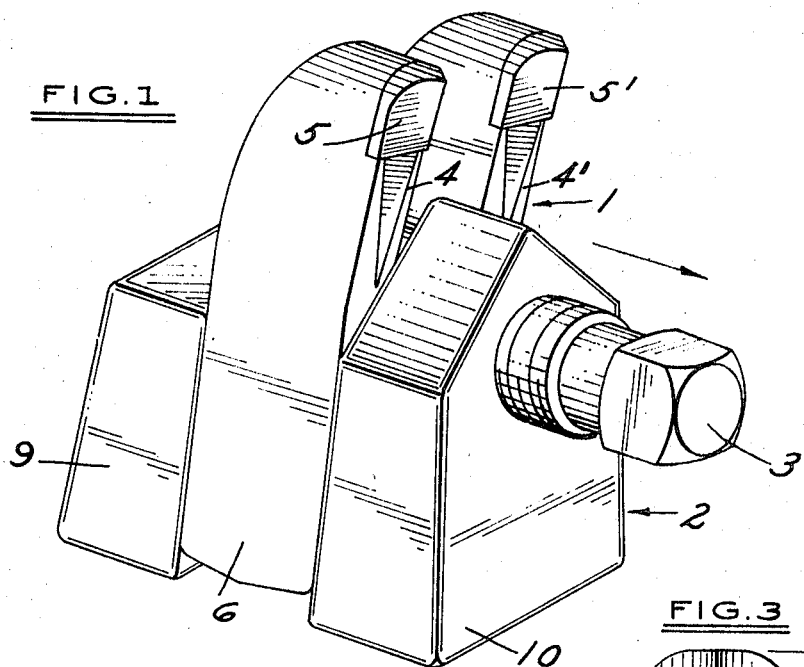
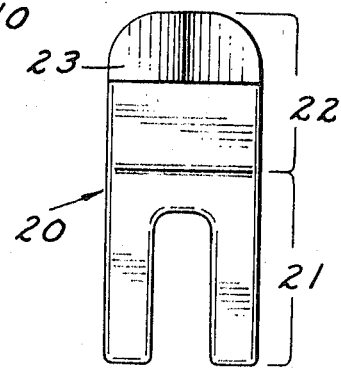
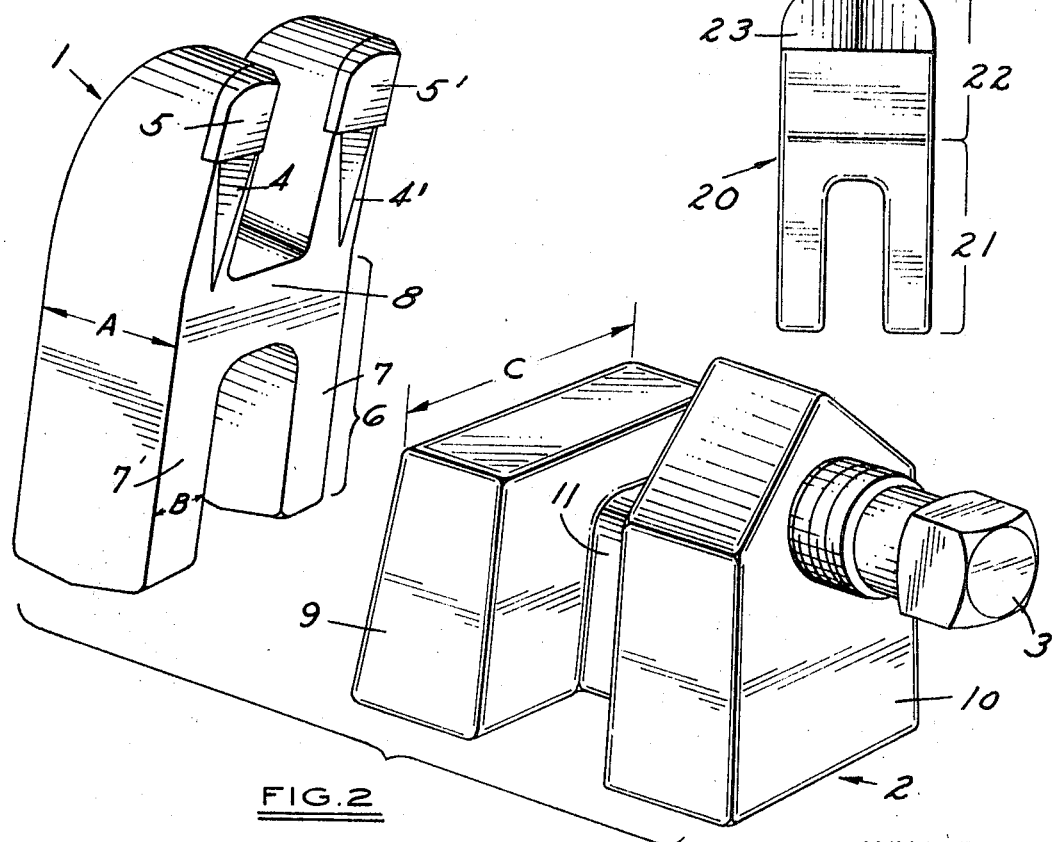
INVENTOR
ARNOLD B. BOWER JR.
BY
Harold J. Holt
ATTORNEY

CUTTER BITS AND BLOCKS FOR MINING MACHINES

This invention relates to cutter bits, to blocks upon which the cutter bits are mounted, and to the combination of such cutter bits and blocks for use on mining machines.

The present invention has for its principal object the design of a cutter bit and mounting means for a cutter bit which provides for greater support of the bit during cutting and, at the same time, certain economies in the fabrication of the mounting means or block.

The invention will be more clearly understood from the following description taken in connection with the accompanying drawing in which:

FIG. 1 is an assembled perspective view of a cutter bit and block in accordance with the invention;

FIG. 2 is an exploded view of the bit and block of FIG. 1; and

FIG. 3 is a front elevational view of a second embodiment of a cutter bit in accordance with the invention.

As shown in FIGS. 1 and 2 of the drawing, the invention comprises a cutter bit 1, releasably held on a block 2 by means of a bolt 3 threaded through a bore in the front of block 2 and abutting against a crossover portion 8 of cutter bit 1. The cutter bit has two head portions 4 and 4', each containing a cutting tip 5 and 5' mounted on its leading edge and facing the direction of cutting (shown by an arrow in FIG. 1). The two head portions extend separately from a shank 6 consisting of two leg members 7 and 7', extending separately from the junction of the head and shank portions formed by the crossover portion 8. The cutter bit thus forms a general H-shaped configuration. Cutting tips 5 and 5', preferably of cemented carbide, extend along the transverse dimension of the leading edge of each of the head portions 4 and 4', i.e., the dimension of the head portion transverse to the cutting direction. Dimension A of each leg member 7 and 7' in the direction of cutting is greater than dimension B transverse to the cutting direction. This is necessary because the greatest impact loads on the shank are taken in the direction of cutting.

Block member 2 comprises a body member having end portions 9 and 10 at opposite ends along the axis of the cutting direction. Between said axial end portions is a midportion 11 forming an inverted U-shaped recess of reduced transverse cross-sectional area. This recess defines a bit-receiving zone complementary in shape to the shape of the shank of the cutter bit 1 and is adapted to receive and releasably hold the cutter bit. As in the case of the shank of the bit, the dimension of the block in the direction of cutting is greater than the transverse dimension.

Perhaps the two principal advantages of the design of the tools of the present invention are (1) larger surface areas are provided to absorb impact loads from cutting, and (2) the kerf width can be cut with the tool in near-vertical position. These advantages will be more clearly understood by the following explanation. The cutter bit of the invention has a seat/or stop area to absorb cutting impact loads both full length (equivalent to dimension A) and width (dimension C) of the bit-receiving zone of the block. A conventional mining cutter bit normally has a stop area which is quite small, less than half of the stop area provided by the present tools. In addition, the cutting tip (see FIG. 1) is mounted on the extreme lateral sides of the block; thus, the tool may be tilted only, for example, 20° from the vertical to provide proper relief of the block during cutting. A standard cutter bit and block, with a ⅝-inch wall thickness around the bit hole, must be tilted at an angle of about 45°, or over twice as far, to provide the necessary relief of the block. This is because a standard tool is mounted within a bore in the center of the block, and block relief must be provided for that portion of the block between the bit and the lateral side of the block. This difference in block relief angles results in a reduction with the present tools in stress which creates bending and side wear of the cutter bit.

A number of additional advantages result from this bit-block design. Block fabrication is possible without expensive drilling and/or broaching and without the required close tolerances of conventional bits and blocks. The present bits and blocks can be used as forged. Additionally, the cutter bit may contain two (or even more) cutting edges, and thus more rapid change of cutting edges is achieved. Two (or more) cutting edges may be changed at one time and less space is required for the same number of cutting edges on the cutting arm of the mining machine.

A second embodiment of the invention is shown in FIG. 3. The cutter bit 20 of FIG. 3 contains a shank 21 of the same design as that of FIGS. 1 and 2 and is adapted to be mounted on a block in the same fashion. The difference between the bit of FIG. 3 and of FIGS. 1 and 2 is that it contains a single broad cutting head 22 extending from and integral with the shank 21 and containing a single cutting tip 23 rather than multiple cutting heads and tips. In addition to the advantages deriving from the bifurcated shank, as spelled out above, the particular advantage of a cutter bit of this configuration is, of course, the extra large cemented carbide tip which may be mounted on the edge of the tool, thereby increasing the cutting ability and life of the cutter bit.

I claim:

1. A bit-block combination for a mining machine comprising a cutter bit and a block on which the bit is releasably held, said bit having a head portion and a shank portion generally falling along a single vertical plane, said head portion containing at least one hard cutting tip mounted on the leading edge thereof facing the direction of cutting, the direction of cutting being generally perpendicular to the plane of the head and shank portions, the shank portion of the bit having two leg members extending vertically and separately from the junction of the head and shank portions, said block member having a bit-receiving zone along a vertical midportion thereof, the dimension of said block in the direction of cutting being greater than the dimension transverse thereto, the leg members of the shank of said bit straddling said bit-receiving zone of the block and releasably held thereon.

2. The bit-block combination of claim 1 in which the cutter bit has two head portions extending separately from the shank portion, each of said head portions containing a hard cutting tip mounted on the leading edge thereof.

3. The bit-block combination of claim 1 in which the bit-receiving zone of the block member is in the form of a inverted U-shaped recess.

4. The bit-block of claim 1 in which the bit is releasably held on the block by a bolt threaded through a bore in the forward portion of the block.

5. A cutter bit for a mining machine having a shank portion and at least two head portions extending separately from the shank portion, said head and shank portions generally falling along a single vertical plane, each of said head portions containing at least one hard cutting tip mounted on the leading edge thereof facing the direction of cutting and extending across the head portion transverse to the cutting direction, the direction of cutting being generally perpendicular to the plane of the head and shank portions, said shank portion having two leg members extending vertically and separately from the junction of the head and shank portions, the dimension of each of said leg members in the direction of cutting being greater than the dimension transverse thereto, said leg members adapted to straddle the block in which the bit is held.